Patented Dec. 5, 1944

2,364,410

UNITED STATES PATENT OFFICE 2,364,410

HALOGENATED POLYTHENES

Donald Whittaker, Northwich, England, assignor to Imperial Chemical Industries Limited, a corporation of Great Britain No Drawing. Application September 12, 1941, Serial No. 410,592. In Great Britain September 27, 1940

1 Claim. (Cl. 260—94)

This invention relates to halogenated products of those solid and semi-solid polymers of ethylene now known as polythenes and more particularly to the stabilisation thereof to the action of heat. The halogenated polythenes to which this invention relates may be obtained by the process described and claimed in Patent No. 2,183,556 of Fawcett, patented December 19, 1939, according to which, normally solid polythenes are subjected to the action of one or more halogens or halogen compounds capable of introducing halogen, preferably in the presence of halogen carriers. They may also be obtained from the semisolid or grease-like polythenes described and claimed in Patents Nos. 2,153,553 of Fawcett et al., patented April 11, 1939, and 2,188,465 of Perrin et al., patented January 30, 1940, by the aforesaid method of halogenation.

The properties of halogenated polythenes vary with the nature of the original polythene, and with the nature and content of halogen, and the conditions of halogenation. Halogenated polythenes, or mixtures thereof such as are described in Patent No. 2,268,162 of Myles and Bridson-Jones, patented December 30, 1941, may be used for various purposes, e. g., the formation of films, tapes, threads and moulded articles, coating, varnishing or impregnating materials such as paper or fabric, and for electrical insulation of wires and cables and as dielectrics in condensers.

The commercial uses of halogenated polythenes are at present restricted owing to their slight instability to the action of heat, for on exposure to heat they tend to evolve hydrogen halides and to darken in colour. The evolution of hydrogen halide sometimes has deleterious effects especially when the halogenated polythenes are used for electrical insulation or in contact with the metals or other substances such as paper or fabric which are attacked by hydrogen halides. The darkening of colour often impairs the appearance of articles made from or coated with halogenated polythenes.

In extreme cases the physical properties of the halogenated polythenes may be altered also; in particular, the tensile strength and flexibility may be decreased and the material may become brittle.

According to the present invention, heat-stable halogenated polythenes are produced by incorporating in the halogenated polythenes a small proportion, suitably 0.1 to 5% by weight, of a weak base or a salt in which the acid radicle is weaker than the basic radicle, excluding compounds containing chromium, manganese, iron, cobalt, nickel, copper, zinc and silver, and excluding oxidising agents. All such weak bases and salts in which the acid radicle is weaker than the basic radicle suppress the evolution of hydrogen halide from halogenated polythenes under the action of heat. Among these substances I prefer lead carbonate, and sodium, potassium and lead salts which do not darken on heating and which are derived from acids whose first (or only) dissociation constant lies within the range $1 \times 10^{-5}$ and $125 \times 10^{-5}$ since such salts, in addition to suppressing hydrogen halide evolution, also inhibit colour darkening of the halogenated polythene when heated.

Examples of the acids from which I prefer to derive the salts include the following: acetic, lactic, tartaric, benzoic, orthomethylol benzoic, salicylic, phosphoric, naphthalic and phthalic acids. Examples of weak bases which may be used include magnesium oxide, calcium hydroxide and oxides of lead. Examples of salts of an acid which is weaker than the base include salts of sodium, potassium, magnesium, calcium, strontium, barium, aluminium and lead, with carbonic, ricinoleic, oleic, maleic, malonic, chloracetic, phenol and other organic acids, and with acids of selenium, arsenic, silicon, tin and boron.

The halogenated polythenes have a very slight tendency to absorb water. This tendency is somewhat increased by the incorporation of those of the above salts which are soluble in water, but is unaffected by those which are insoluble in water, such as many of the salts of lead. I therefore prefer to use the water-insoluble salts as stabilisers whenever the halogenated polythenes are to be used for purposes where a low water absorption is desirable, such as electrical insulation.

This invention may be employed for stabilising halogenated polythenes derived from normally solid polymers of ethylene, such as those obtained by the process described in specification No. 2,183,556. The invention is also applicable to halogenated products derived from semi-solid or grease-like polythenes, and to all halogenated polythenes, whatever their origin, halogen content, and method of halogenation. Solutions of halogenated polythenes may also be stabilised by dissolving therein those of the stabilisers of the present invention which are soluble, or by suspending or dispersing therein in a finely divided form those which are not soluble in the selected solvent. Halogenated polythenes of all halogen contents may be treated according to the invention. Generally they will contain between 2 and 80% by weight of halogen. At present the chlorinated polythenes are of the greatest technical interest, in particular those derived from normally solid polythenes and having a chlorine content between 20 and 70% by weight.

The stabiliser may be incorporated with the halogenated polythenes by any convenient method. The halogenated polythene may be softened by passing through heated rollers at an elevated temperature such as 70°–120° C., with the stabiliser in a powdered form until an intimate mixture is obtained. The powdered stabiliser may be mixed with powdered halogenated polythene, or they may be ground together. The stabiliser may be dissolved, or may be dispersed or suspended in a powdered or finely divided form, in a solution of halogenated polythene. This solution may then be used as such, for example as a varnish or for coating or spraying on materials or for casting articles on a mould. Stabilised halogenated polythenes may also be obtained from such a solution by evaporating or steam distilling the solvent or by precipitating the stabilised halogenated polythene by adding a liquid which is miscible with the solvent but is itself a non-solvent for the halogenated polythene and the stabiliser, under the conditions of working. One or more of these stabilisers may be used or they may be used along with other known stabilisers in particular with those described and claimed in application No. 373,380 for the stabilisation of halogenated polythenes against the action of light. By this means may be obtained a halogenated polythene which is stable on exposure to light and elevated temperatures.

The invention is illustrated but not restricted by the following examples, in which the parts are by weight:

Example 1

The chlorinated polythene used in this example contains 50 per cent chlorine and is prepared from a polythene of mean molecular weight about 12,000 (Staudinger solution viscosity method); it is a tough, surface-hard, flexible material. Small pieces of the sample are heated at 110° C. in a continuous stream of carbon dioxide-free air which subsequently passes through a neutral aqueous methyl orange solution. It is observed that this solution reddens after an induction period of 1 to 1½ hours, indicating that the sample is beginning to evolve hydrochloric acid. The same sample exhibited colour-darkening under the action of heat, 3 hours' heating at 150° C. changing the colour from a pale straw to a dark brown.

Two per cent of sodium tartrate is incorporated, by mixing hot rollers at 110° C. for 5 minutes, with a sample of the same chlorinated polythene. Small pieces of this are heated at 110° C. for 42 hours before any evolution of hydrochloric acid is observed. The same sample exhibited no colour darkening after 3 hours' heating at 150° C.

Samples of the same chlorinated polythene stabilised with 2 per cent sodium salicylate have an induction period of 156 hours at 110° C. before hydrochloric acid is evolved; no colour darkening is observed after 3 hours' heating at 150° C.

Example 2

Halogenated polythene prepared from polythene of mean molecular weight 12,000 and containing 40% by weight of chlorine, was mixed on hot rolls, with 2% by weight of lead carbonate. The resulting composition was rolled out into a thin translucent sheet. When a portion of this sheet was heated at 140° C. in a stream of dry carbon dioxide free air, 16 hours elapsed before any HCl was produced. A sample of halogenated polythene, in all respects similar to the above, but containing no lead carbonate, on heating at 140° began to evolve HCl after 1 hour.

Example 3

A finely divided halogenated polythene containing 55% chlorine made from polythene of mean molecular weight 12,000 was mixed in a rotating barrel mixer with 2% by weight of finely powdered sodium ricinoleate. It was pressed into a sheet between metal plates at 130° C., and on testing by the method described in Example 2, HCl was evolved after 14 hours; corresponding unstabilised halogenated polythene evolved HCl after ¾ hour.

Example 4

To 100 grams of halogenated polythene containing 60% chlorine made from polythene of mean molecular wieght 9,000, was added 100 ccs. of xylene and 2 grams of finely powdered potassium borate. The resulting mixture was milled in a ball mill for 24 hours, during this time a further 300 ccs. of xylene was added gradually. The resulting solution was a translucent varnish which, on brushing on a smooth continuous metal surface, dried to a hard translucent film. On heating it to 140° C., the metal surface was not discoloured until it had been heated for 12 hours. Using a corresponding varnish prepared without potassium borate, the metal surface was discoloured after 20 minutes' heating at 140° C.

Example 5

The chlorinated polythene employed in this example contains 50 per cent chlorine and is prepared from polythene of mean molecular weight 12,000. 2 per cent by weight of various salts are incorporated in a series of samples. The degrees of stabilisation of the samples against hydrochloric acid evolution and colour darkening respectively under the action of heat are evaluated as in Example 1. The following table summarises the results:

| Salt | Degree of stabilization against hydrochloric acid evolution (induction period) | Degree of stabilization against color darkening | First (or only) dissociation constant of acid |
|---|---|---|---|
| None | {1–1½ hours at 110° C. <br> 1–1½ hours at 140° C. | | |
| Sodium acetate | 28 hours at 110° C. | Excellent | $1.8 \times 10^{-5}$ |
| Sodium lactate | 91 hours at 110° C. | Good | $13.6 \times 10^{-5}$ |
| Sodium tartrate | 42 hours at 110° C. | Excellent | $59 \times 10^{-5}$ |
| Sodium tartrate | 7 hours at 140° C. | do | |
| Lead tartrate | 23 hours at 140° C. | do | |
| Sodium benzoate | 28 hours at 110° C. | Fair | $61 \times 10^{-5}$ |
| Sodium orthomethylol benzoate | 6 hours at 140° C. | Excellent | $15 \times 10^{-5}$ |
| Sodium salicylate | 156 hours at 110° C. | do | $95 \times 10^{-5}$ |
| Disodium phosphate | 6 hours at 140° C. | do | $110 \times 10^{-5}$ |
| Trisodium phosphate | 37 hours at 140° C. | do | |
| Sodium naphthalate | Over 46 hours at 110° C. | do | $70 \times 10^{-5}$ |
| Sodium phthalate | Over 114 hour at 110° C. | do | $117 \times 10^{-5}$ |
| Lead phthalate | 4 hours at 140° C. | Good | |

For comparison, salts of acids of dissociation constant below $1 \times 10^{-5}$ do not inhibit colour darkening, but being salts of acids which are weaker than the bases, they stabilise the halogenated polythene against hydrogen chloride evolution. Salts of acids which are as strong as the base, such as sodium sulphate and sodium chloride, do not stabilise against hydrogen chloride evolution or colour darkening.

I claim:

Chlorinated polythene containing from 0.1 to 5.0% of sodium lactate.

DONALD WHITTAKER.